(12) United States Patent
Lee

(10) Patent No.: US 12,264,718 B2
(45) Date of Patent: Apr. 1, 2025

(54) BRAKE DEVICE FOR VEHICLE AND APPARATUS AND METHOD FOR CALIBRATING BRAKING FORCE OF BRAKE DEVICE TO ZERO POINT

(71) Applicant: HYUNDAI MOBIS CO., LTD., Seoul (KR)

(72) Inventor: Dong Geun Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 416 days.

(21) Appl. No.: 17/724,576

(22) Filed: Apr. 20, 2022

(65) Prior Publication Data

US 2023/0160447 A1 May 25, 2023

(30) Foreign Application Priority Data

Nov. 24, 2021 (KR) .................. 10-2021-0163301
Nov. 29, 2021 (KR) .................. 10-2021-0166921

(51) Int. Cl.
*F16D 65/18* (2006.01)
*F16D 66/00* (2006.01)
*F16D 121/20* (2012.01)

(52) U.S. Cl.
CPC ........ *F16D 65/18* (2013.01); *F16D 2066/003* (2013.01); *F16D 2066/005* (2013.01); *F16D 2121/20* (2013.01)

(58) Field of Classification Search
CPC .............. F16D 65/18; F16D 2066/003; F16D 2066/005; F16D 2121/20

(Continued)

(56) References Cited

U.S. PATENT DOCUMENTS 7,849,976 B2 * 12/2010 Kawahara ............... F16D 65/18
303/162
8,146,715 B2 * 4/2012 Baier-Welt ............. F16D 66/00
188/73.1

(Continued)

FOREIGN PATENT DOCUMENTS

JP        2010-265971 A    11/2010
KR       10-0456779 B1    11/2004
KR    10-2021-0002011 A    1/2021

OTHER PUBLICATIONS

Office Action issued on Jun. 13, 2023 in the corresponding Korean Patent Application No. 10-2021-0163301.

*Primary Examiner* — Christopher P Schwartz
(74) *Attorney, Agent, or Firm* — NovoTechIP International PLLC

(57) ABSTRACT

A brake device for a vehicle according to the present disclosure includes: a caliper body configured to surround a brake disc; a pair of brake pads disposed in the caliper body so as to face each other and respectively positioned at two opposite sides of the brake disc; a screw bar installed in the caliper body and configured to be rotatable by power from a motor unit; a nut unit configured to be rectilinearly moved by a rotation of the screw bar; a piston unit configured to surround an outer portion of the nut unit and press any one of the pair of brake pads by moving together with the nut unit; a bearing unit configured to support a rotation of the screw bar and be moved by a repulsive force of the screw bar; and a load switch unit installed in the caliper body, disposed to face the bearing unit, and configured to operate by being pressed by the bearing unit.

18 Claims, 12 Drawing Sheets

(58) Field of Classification Search
USPC .................................. 188/1.11 E, 156–162
See application file for complete search history.

(56) References Cited

U.S. PATENT DOCUMENTS

| | | | | |
|---|---|---|---|---|
| 10,442,413 | B2* | 10/2019 | Tanaka | F16D 65/183 |
| 11,993,239 | B2* | 5/2024 | Goto | F16D 65/64 |
| 2007/0228815 | A1* | 10/2007 | Horiuchi | G01L 5/28 |
| | | | | 303/112 |

* cited by examiner

BRAKE DEVICE FOR VEHICLE AND APPARATUS AND METHOD FOR CALIBRATING BRAKING FORCE OF BRAKE DEVICE TO ZERO POINT

CROSS-REFERENCE TO RELATED APPLICATIONS

This application claims the benefit under 35 U.S.C. § 119(a) of Korean Patent Application No. 10-2021-0163301 filed on Nov. 24, 2021 and Korean Patent Application No. 10-2021-0166921 filed on Nov. 29, 2021 in the Korean Intellectual Property Office, the entire disclosure of which is incorporated herein by reference for all purposes.

BACKGROUND

1. Technical Field

Exemplary embodiments of the present disclosure relate to a brake device or system for a vehicle and an apparatus and method for calibrating a braking force of the brake device to a zero point, and more particularly, to a brake device for a vehicle and an apparatus and method for calibrating a braking force of the brake device to a zero point, which are capable of reducing an ineffective stroke and calibrating a point in time at which generation of a load by motor current is estimated by using a point in time at which a load is actually generated on brake pads.

2. Discussion of Related Art

In general, an electronic mechanical brake (EMB) for a vehicle presses a piston by converting a rotational force of a drive motor into a rectilinear motion by using a screw-nut mechanism. The pressed piston presses brake pads, which are friction members, against a wheel disc, thereby generating a braking force.

The electronic mechanical brake in the related art hardly estimates positions in respect to points in time at which the braking force is generated and released, only on the basis of control information applied to the motor. Further, it is impossible to calibrate the initial position in accordance with abrasion of the brake pads.

In addition, the electronic mechanical brake for a vehicle in the related art generates a load by pushing the brake pads rectilinearly by mechanically converting a rotation by controlling the electric current of the motor.

However, the electronic mechanical brake for a vehicle in the related art cannot estimate the positions in respect to the actual points in time at which the braking force is generated and released, only on the basis of the control information applied to the motor. Further, the electronic mechanical brake for a vehicle in the related art cannot estimate an actual braking force, during a braking operation performed by a driver, only by the operation of a load switch.

The background technology of the present disclosure is disclosed in Korean Patent No. 10-0456779 (registered on Apr. 29, 2004 and entitled 'Brake Device for Vehicle').

SUMMARY

Various embodiments are directed to a brake device or system for a vehicle, which is capable of reducing initial ineffectiveness, i.e., an ineffective stroke by resetting and restoring an initial point in time of an operation on the basis of a point in time at which a braking force is released by recognizing points in time at which the braking force is generated and released.

Various embodiments are also directed to an apparatus and method for calibrating a braking force of a brake device for a vehicle to a zero point, which are capable of calibrating a point in time at which generation of a load by motor current is estimated by using a point in time at which a load is actually generated on brake pads of a brake device for a vehicle.

In an embodiment, a brake device for a vehicle includes: a caliper body configured to surround a brake disc; a pair of brake pads disposed in the caliper body so as to face each other and respectively positioned at two opposite sides of the brake disc; a screw bar installed in the caliper body and configured to be rotatable by power from a motor unit; a nut unit configured to be rectilinearly moved by a rotation of the screw bar; a piston unit configured to surround an outer portion of the nut unit and press any one of the pair of brake pads by moving together with the nut unit; a bearing unit configured to support a rotation of the screw bar and be moved by a repulsive force of the screw bar; and a load switch unit installed in the caliper body, disposed to face the bearing unit, and configured to operate by being pressed by the bearing unit.

In addition, the brake device may further include a control unit configured to receive an electrical signal from the load switch unit and control an operation of the motor unit on the basis of the electrical signal.

In addition, the load switch unit may include: a housing part installed in the caliper body; a movable block part installed in the housing part configured to be moved by being pressed by the bearing unit, the movable block part being configured to be returned to an original position thereof by an elastic restoring force when the bearing unit is released; and a connector part configured to transmit the electrical signal to the control unit by coming into contact with the movable block part when the movable block part moves.

In addition, the movable block part may protrude to the outside of the housing part.

In addition, the movable block part may include: a movable block movably disposed in the housing part and configured to come into contact with the connector part; and an elastic member connected to the movable block, coupled to the connector part, and configured to elastically support the movable block.

In addition, the connector part may include: a connector main body coupled to the elastic member; and a contact point part mounted in the connector main body and configured to generate the electrical signal by coming into contact with the movable block.

In addition, the movable block may include: a movable block main body elastically supported by the elastic member; and a conductor plate installed in the movable block main body and configured to come into contact with the contact point part.

In addition, the contact point part may include: a contact point protrusion mounted in the connector main body and configured to come into contact with the conductor plate; and a terminal connected to the contact point protrusion and configured to transmit the electrical signal to the control unit, the electrical signal being generated between the contact point protrusion and the conductor plate when the conductor plate comes into contact with the contact point protrusion.

In an embodiment, an apparatus for calibrating a braking force of a brake device for a vehicle to a zero point includes: a load switch unit configured to output an electrical signal when a brake pad actually presses a brake disc and a screw bar is moved rearward by a repulsive force; a motor current measurement unit configured to measure motor current of a motor that rotates the screw bar so that the brake pad presses the brake disc; and a control unit configured to estimate, for each motor current, an estimated load applied to the screw bar during a process of operating the motor and calibrate the estimated load to a zero point on the basis of the electrical signal.

The control unit according to the present disclosure may calibrate the estimated load to the zero point on the basis of the estimated load estimated at a point in time at which the electrical signal is inputted.

When the estimated load is not 0 at the point in time at which the electrical signal is inputted, the control unit according to the present disclosure may calibrate the estimated load at the point in time at which the electrical signal is inputted to 0.

The control unit according to the present disclosure may calibrate all the estimated loads for the respective motor currents on the basis of the zero point calibrated at the point in time at which the electrical signal is inputted.

The control unit according to the present disclosure may determine that a motor current monitoring function of the motor current measurement unit fails when the estimated load is maintained to be 0 for a predetermined time or longer after the electrical signal is inputted.

In an embodiment, a method of calibrating a braking force of a brake device for a vehicle to a zero point includes: measuring, by a motor current measurement unit, motor current of a motor when the motor rotates a screw bar so that a brake pad presses a brake disc and detecting, by a control unit, an estimated load estimated as being applied to the screw bar for each motor current of the motor measured by the motor current measurement unit; outputting, by a load switch unit, an electrical signal when the brake pad actually presses the brake disc and the screw bar is moved rearward by a repulsive force; and performing, by the control unit, zero point calibration on the estimated load on the basis of a point in time at which the electrical signal is inputted when the electrical signal is inputted from the load switch unit.

The performing of the zero point calibration on the estimated load according to the present disclosure may include performing the zero point calibration on the estimated load on the basis of the estimated load estimated at the point in time at which the electrical signal is inputted.

The performing of the zero point calibration on the estimated load according to the present disclosure may include calibrating the estimated load at the point in time at which the electrical signal is inputted to 0 when the estimated load at the point in time at which the electrical signal is inputted is not 0.

In the performing of the zero point calibration on the estimated load according to the present disclosure, the control unit may calibrate all the estimated loads for the respective motor currents on the basis of the zero point calibrated at the point in time at which the electrical signal is inputted.

The method according to the present disclosure may further include determining, by the control unit, that a motor current monitoring function of the motor current measurement unit fails when the estimated load is maintained to be 0 for a predetermined time or longer after the electrical signal is inputted.

According to the brake device for a vehicle according to the present disclosure, the control unit may use the load switch unit to recognize the points in time at which the braking force is generated and released. Therefore, the control unit does not always return the position of the screw bar to the initial point in time at which the braking force is generated, but resets the initial point in time of the operation on the basis of the point in time at which the braking force is released, and then returns the position of the screw bar to the reset point in time, thereby reducing initial ineffectiveness, i.e., an ineffective stroke.

In addition, in the present disclosure, the initial point in time of the operation of the screw bar is reset in accordance with abrasion of the brake pad, which makes it possible to reduce the ineffective stroke during the subsequent braking operation.

The apparatus and method for calibrating the braking force of the brake device for a vehicle to the zero point according to the present disclosure may calibrate the point in time at which the generation of the load by the motor current is estimated by using the point in time at which the load is actually generated on the brake pads of the brake device for a vehicle, thereby reducing the initial ineffectiveness and improving precision in calculating the output load.

DETAILED DESCRIPTION

Figure 1:
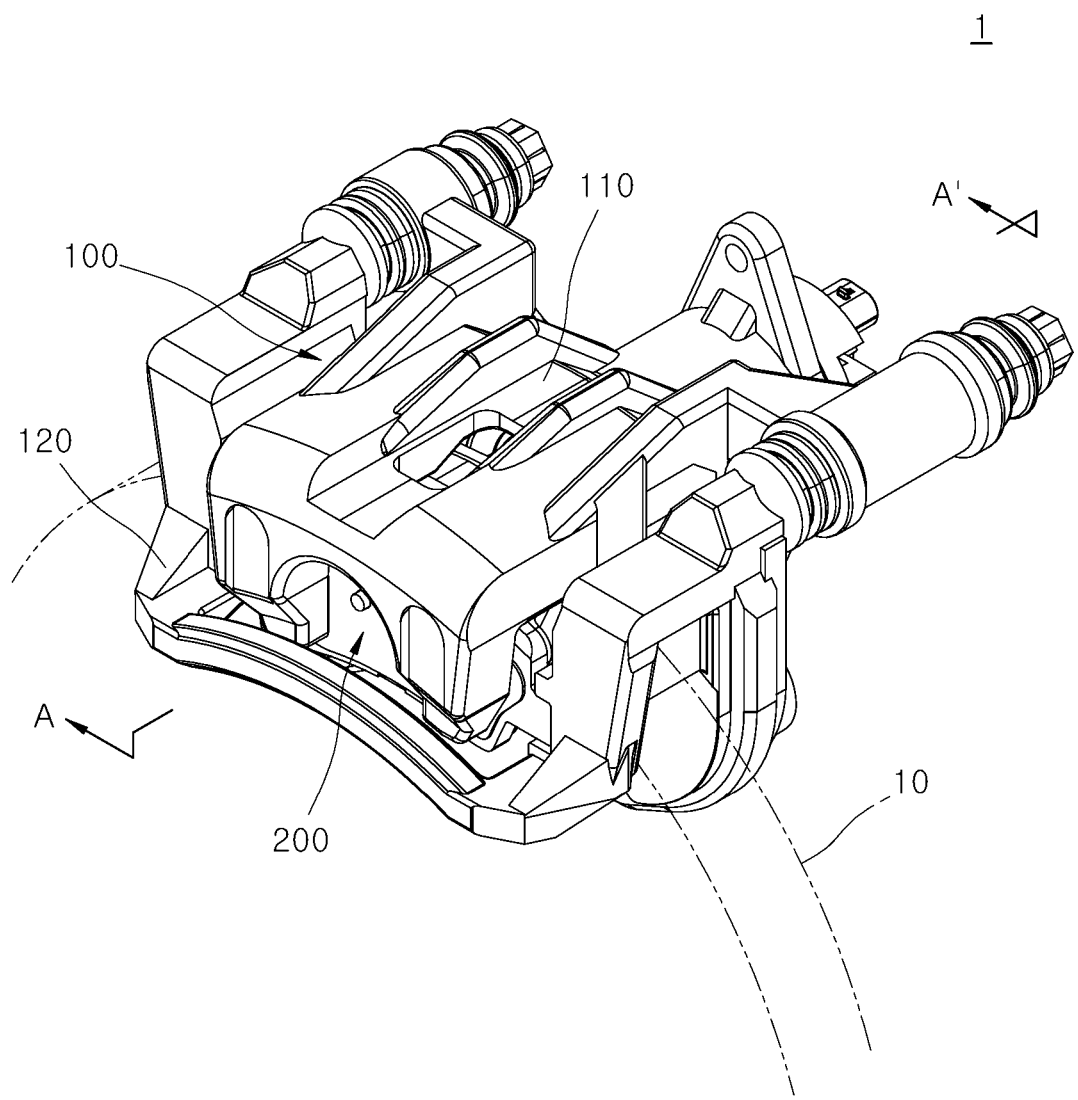
FIG. 1 is a perspective view of a brake device for a vehicle according to an embodiment of the present disclosure.

Hereinafter, a brake device or system for a vehicle and an apparatus and method for calibrating a braking force of the brake device or system to a zero point according to an embodiment of the present disclosure will be described in detail with reference to the accompanying drawings. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

Figure 2:
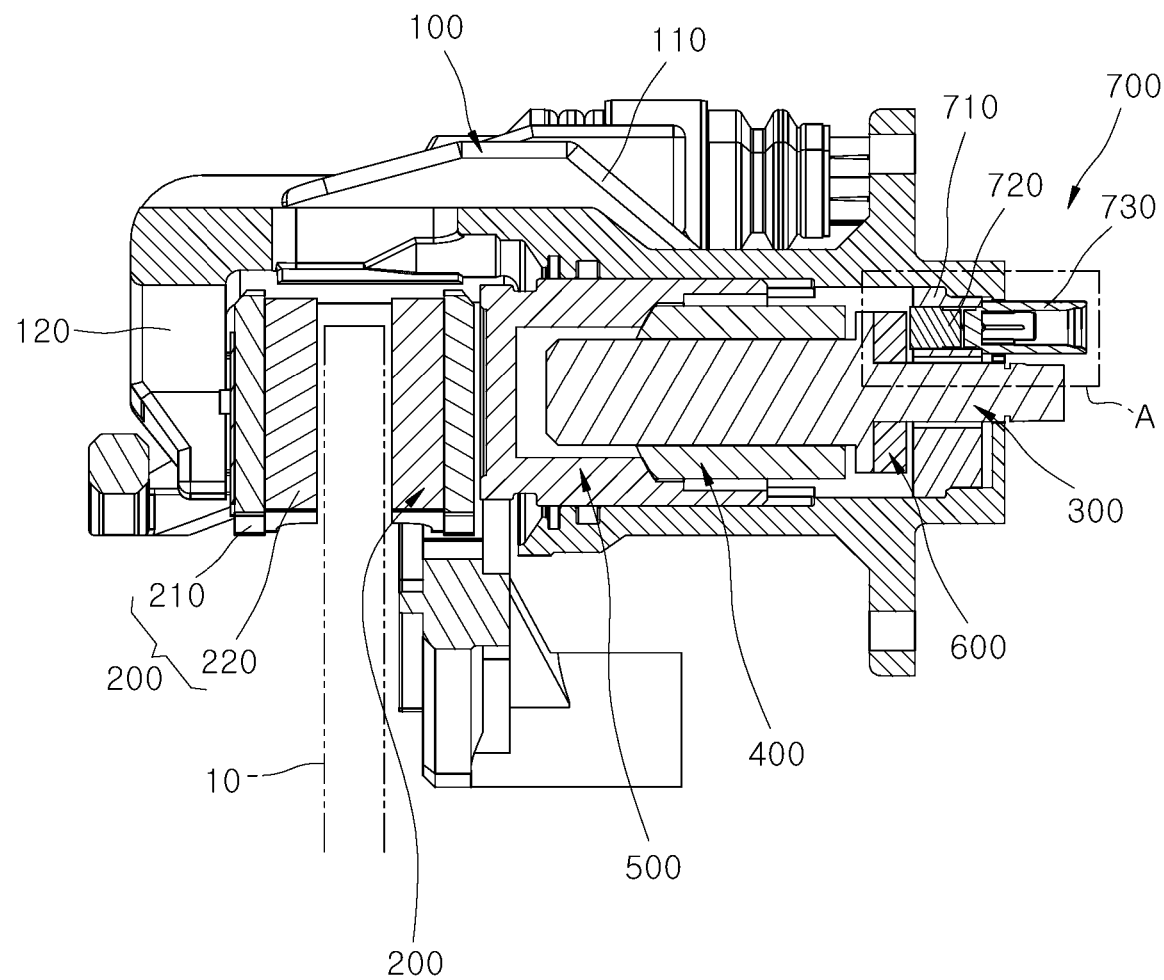
FIG. 2 is a cross-sectional view taken along line A-A' in FIG. 1.
Figure 3:
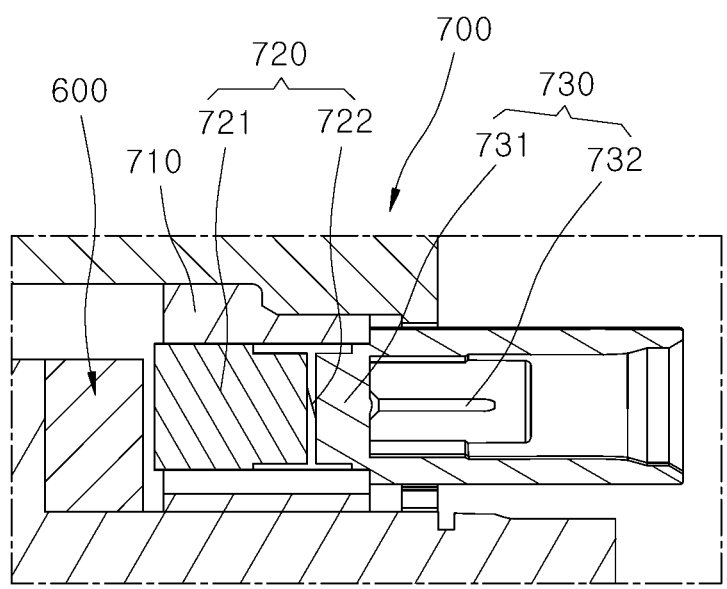
FIG. 3 is an enlarged view of part A in FIG. 2.
Figure 4:
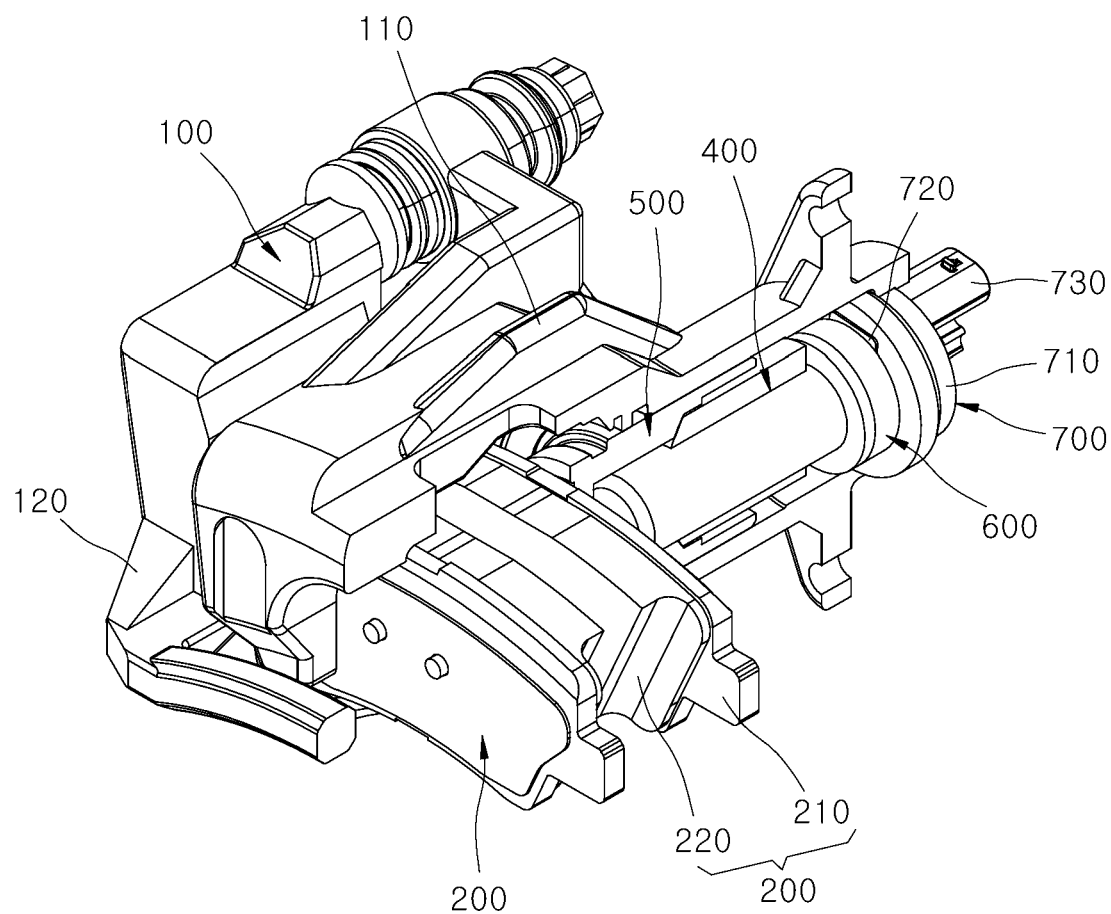
FIG. 4 is a half cross-sectional perspective view of the brake device for a vehicle according to the embodiment of the present disclosure.
Figure 5:
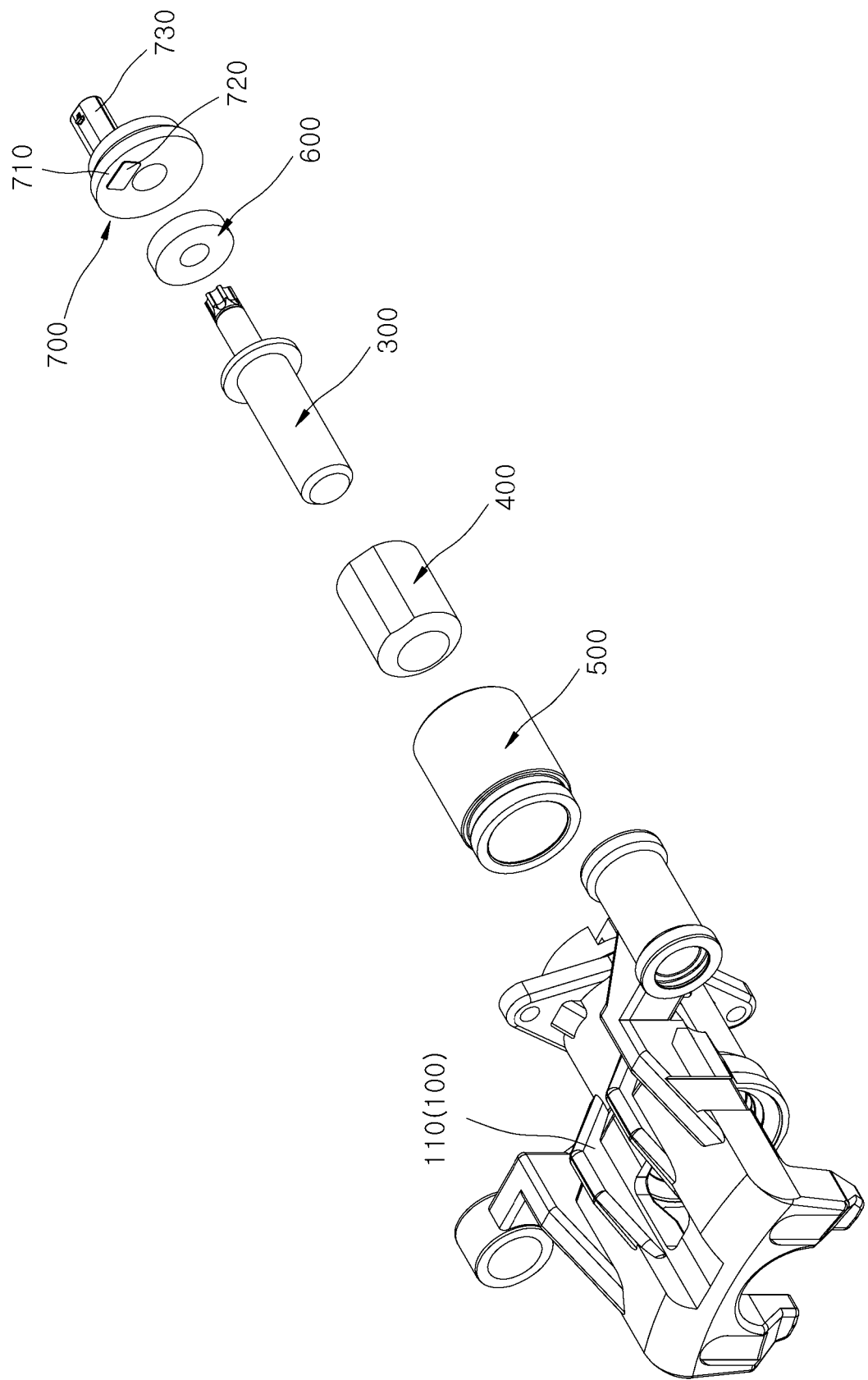
FIG. 5 is an exploded perspective view of a main part of the brake device for a vehicle according to the embodiment of the present disclosure.
Figure 6:
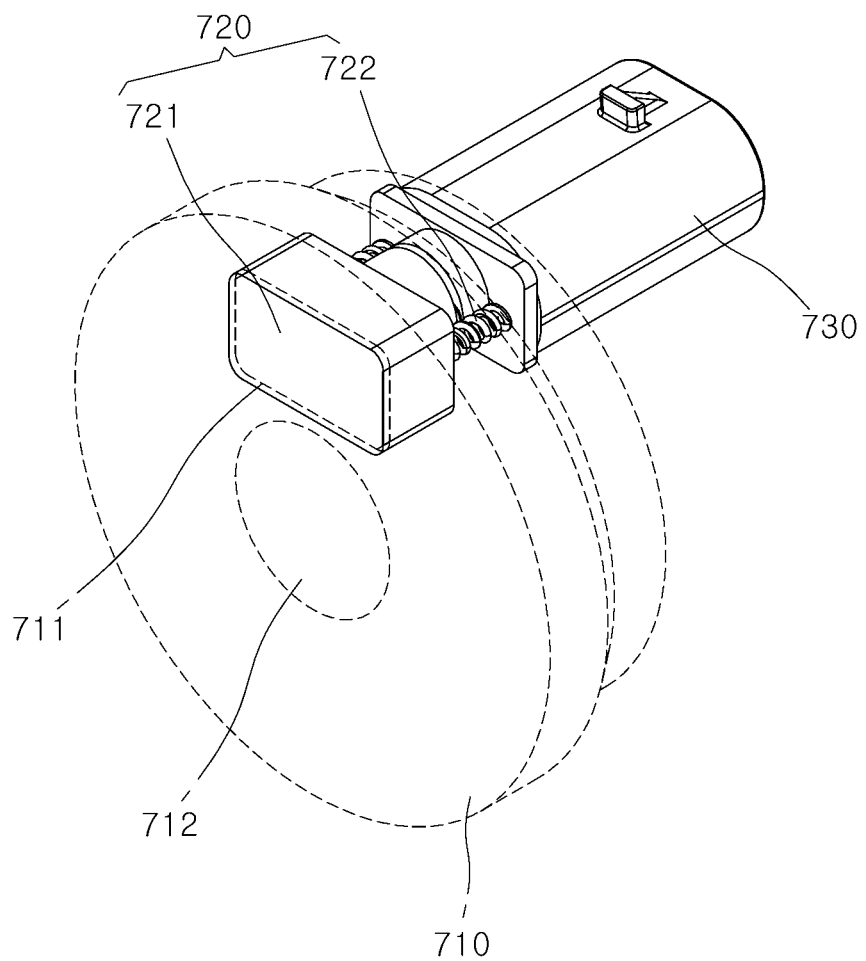
FIG. 6 is a perspective view illustrating a load switch unit of the brake device for a vehicle according to the embodiment of the present disclosure.
Figure 7:
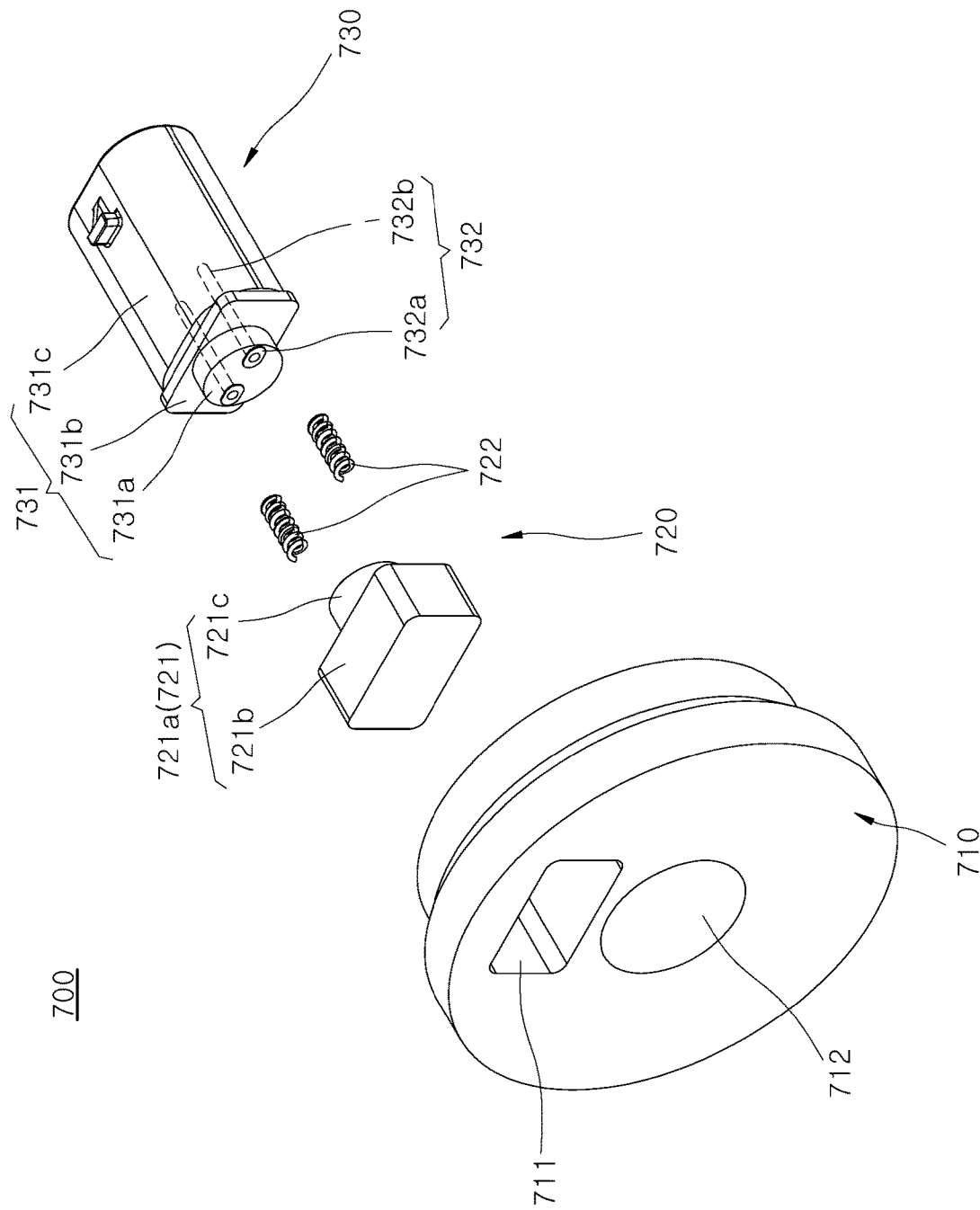
FIG. 7 is an exploded perspective view of the load switch unit of the brake device for a vehicle according to the embodiment of the present disclosure.
Figure 8:
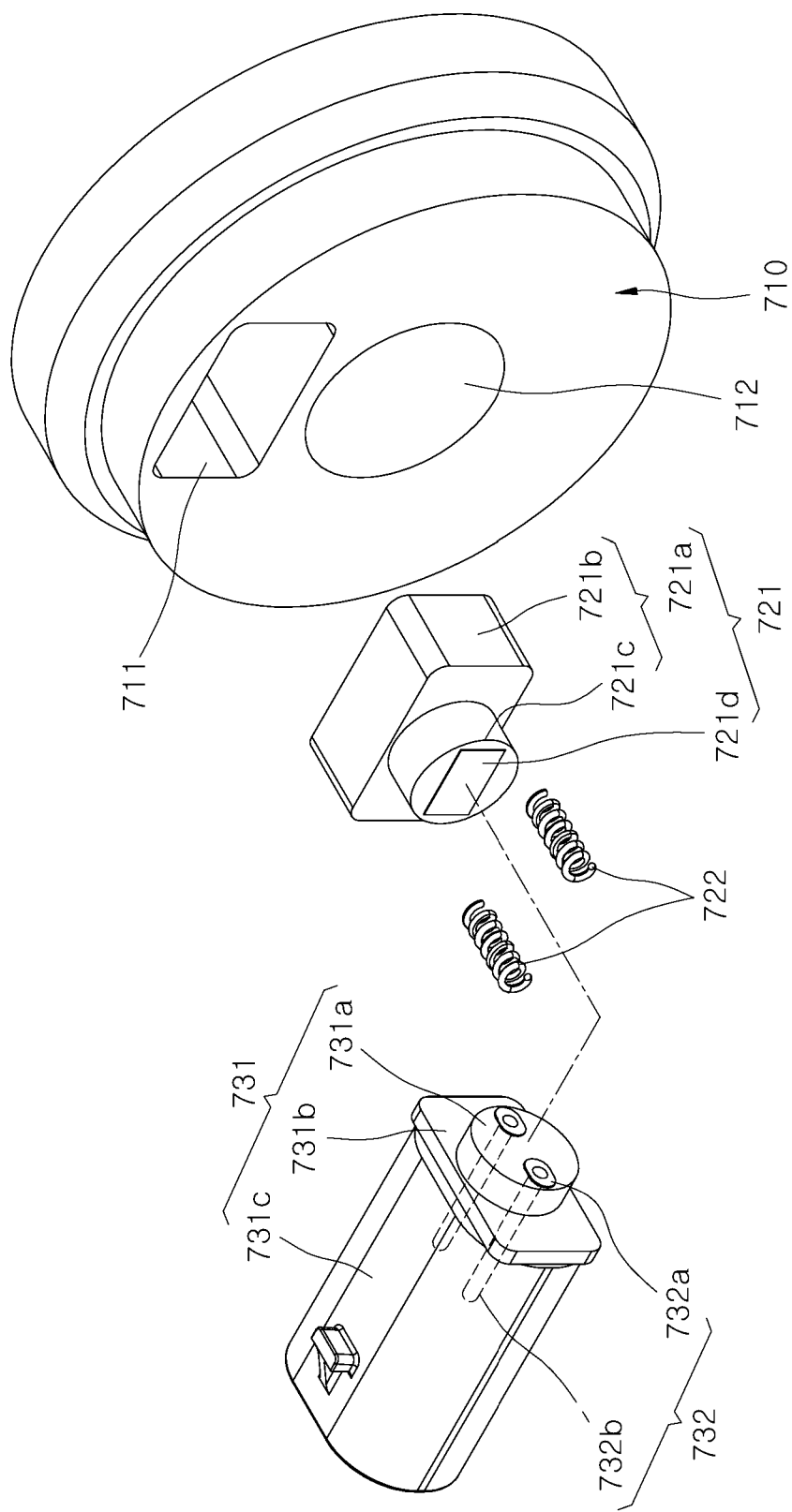
FIG. 8 is a perspective view of FIG. 7 when viewed in another direction.
Figure 9:
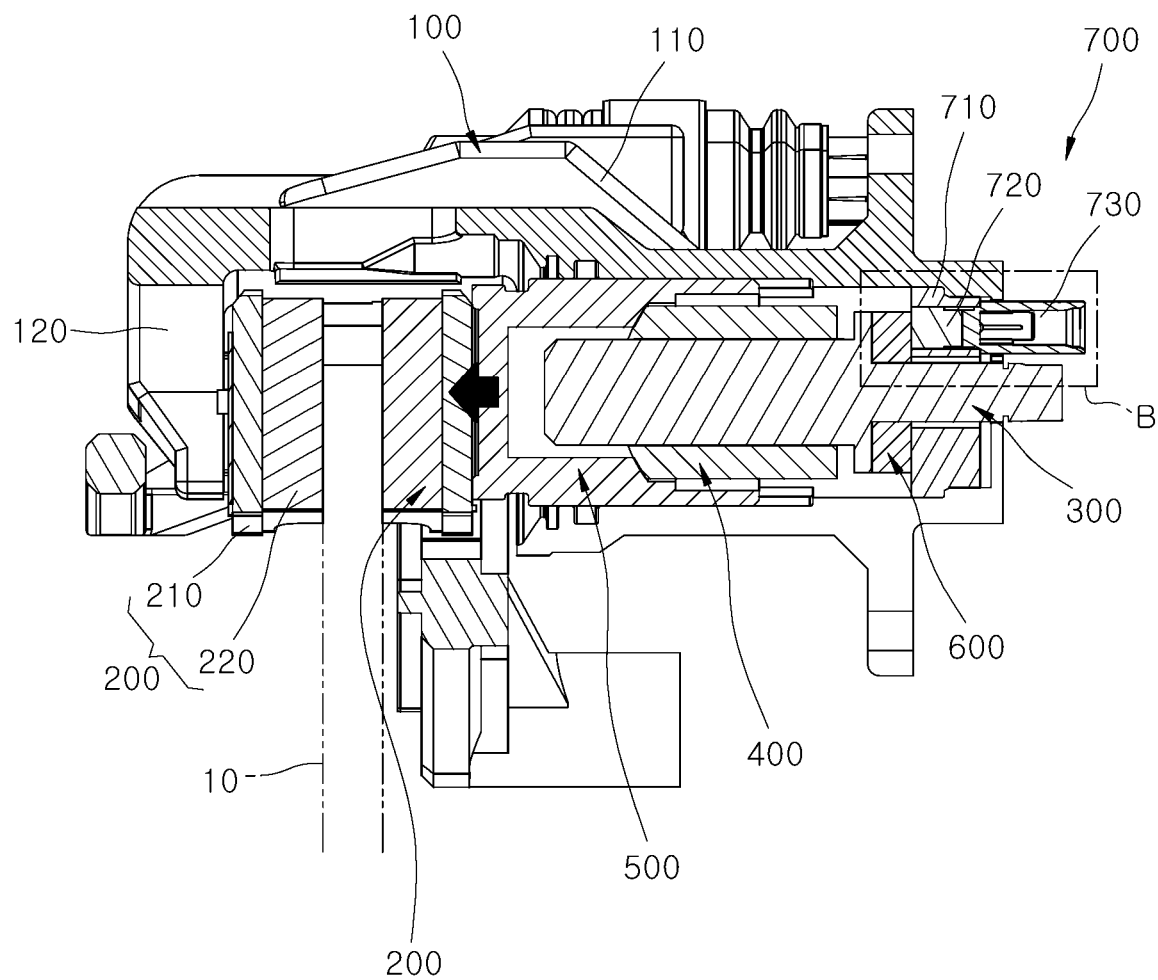
FIG. 9 is a view illustrating a state in which the load switch unit operates when the brake device for a vehicle according to the embodiment of the present disclosure performs a braking operation.
Figure 10:
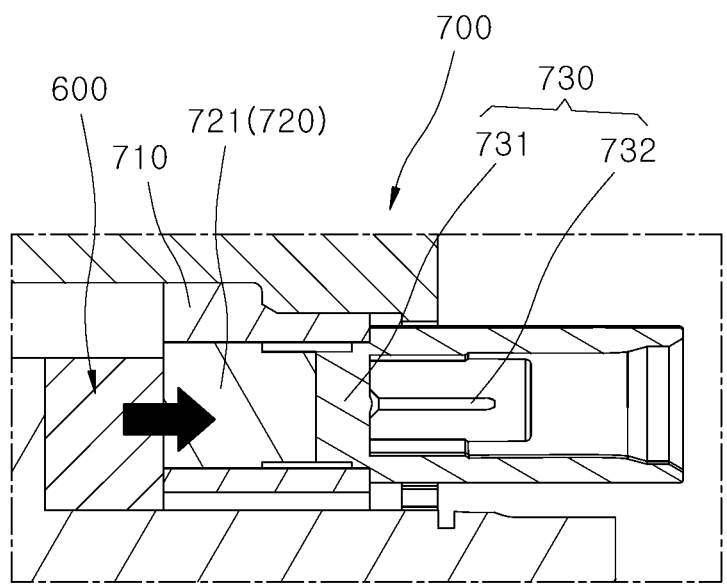
FIG. 10 is an enlarged view of part B in FIG. 9.

FIG. 1 is a perspective view of a brake device for a vehicle according to an embodiment of the present disclosure, FIG. 2 is a cross-sectional view taken along line A-A' in FIG. 1, FIG. 3 is an enlarged view of part A in FIG. 2, FIG. 4 is a half cross-sectional perspective view of the brake device for a vehicle according to the embodiment of the present disclosure, FIG. 5 is an exploded perspective view of a main part of the brake device for a vehicle according to the embodiment of the present disclosure, FIG. 6 is a perspective view illustrating a load switch unit of the brake device for a vehicle according to the embodiment of the present disclosure, FIG. 7 is an exploded perspective view of the load switch unit of the brake device for a vehicle according to the embodiment of the present disclosure, FIG. 8 is a perspective view of FIG. 7 when viewed in another direction, FIG. 9 is a view illustrating a state in which the load switch unit operates or is activated when the brake device for a vehicle according to the embodiment of the present disclosure performs a braking operation, and FIG. 10 is an enlarged view of part B in FIG. 9.

Figure 11:
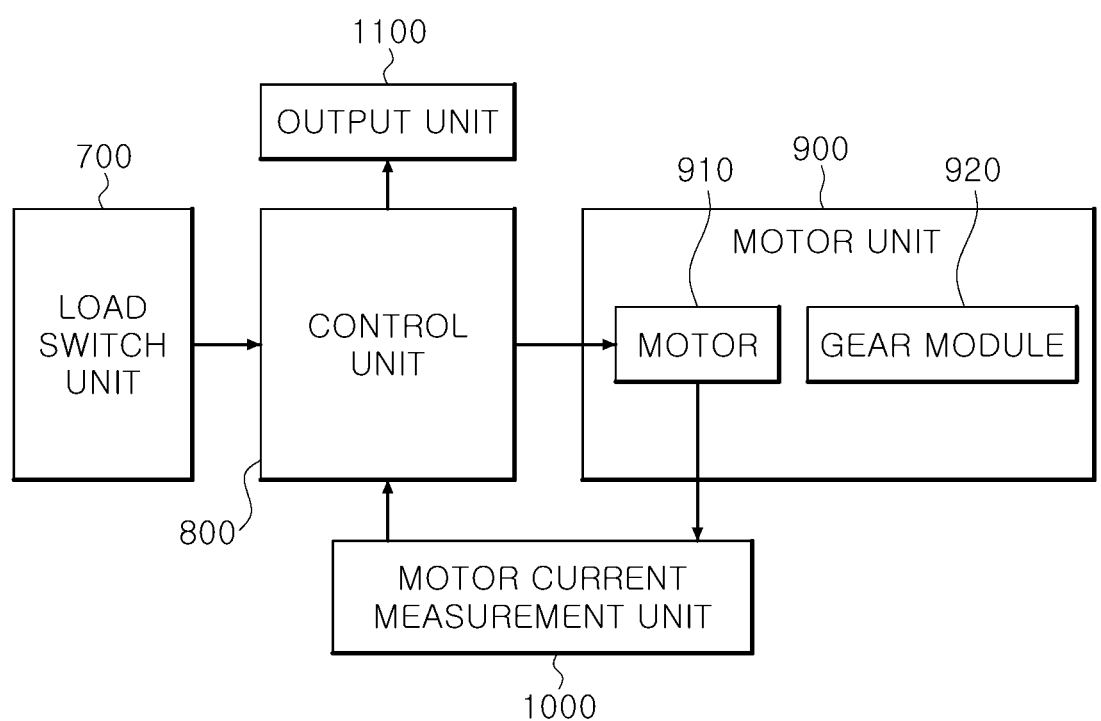
FIG. 11 is a block configuration view of an apparatus for calibrating a braking force of the brake device for a vehicle to a zero point according to the embodiment of the present disclosure.

Referring to FIGS. 1 to 10, a brake device 1 for a vehicle according to an embodiment of the present disclosure includes a caliper body 100, a pair of brake pads 200, a screw bar 300, a nut unit 400, a piston unit 500, a bearing unit 600, a load switch unit 700, and a control unit 800 (illustrated in FIG. 11). The caliper body 100 surrounds a brake disc 10. The caliper body 100 includes a first caliper body 110 and a second caliper body 120.

The screw bar 300, the nut unit 400, the piston unit 500, the bearing unit 600, the load switch unit 700, and a motor unit 900 (illustrated in FIG. 11) are mounted in the first caliper body 110. The second caliper body 120 is connected to the first caliper body 110 and mounted to face the pair of brake pads 200.

The pair of brake pads 200 is disposed in the caliper body 100 so as to face each other and respectively positioned at two opposite sides of the brake disc 10. Specifically, the brake pads 200 each include a backplate 210 and a friction member 220. The backplate 210 faces the piston unit 500 to be described below. The backplate 210 is pressed by the piston unit 500.

The friction member 220 is coupled to a surface of the backplate 210 facing the brake disc 20. The friction member 220 may come into contact with the brake disc 10.

The screw bar 300 is installed in the caliper body 100 and may be rotated by power from the motor unit 900. The screw bar 300 has a rod shape and is inserted into the nut unit 400 to be described below. An external thread (not illustrated) is provided on an outer portion of the screw bar 300, and the screw bar 300 is rotated by a rotational force transmitted from the motor unit 900 to be described below.

The motor unit 900 transmits the power to the screw bar 300. The motor unit 900 includes a motor 910 and a gear module 920. The gear module 920 includes a plurality of gears, any one of the plurality of gears is connected to the motor 910, and another of the plurality of gears is connected to the screw bar 300. That is, the gear module 920 receives the rotational force from the motor 910 and rotates the screw bar 300.

The nut unit 400 is rectilinearly moved by the rotation of the screw bar 300. The nut unit 400 surrounds an outer portion of the screw bar 300 and selectively moves toward the brake pad 200 or away from the brake pad 200 depending on the rotation direction of the screw bar 300.

Specifically, when the screw bar 300 rotates in a predetermined direction, the nut unit 400 moves toward the brake pad 200 by converting the rotational motion of the screw bar 300 into the rectilinear motion. On the contrary, when the screw bar 300 rotates in a direction opposite to the predetermined direction, the nut unit 400 moves away from the brake pad 200.

The piston unit 500 is shaped to surround an outer portion of the nut unit 400 and presses any one of the pair of brake pads 200 by moving together with the nut unit 400. The piston unit 500 has a cylindrical shape, a portion of the piston unit 500 into which the nut unit 400 is inserted is opened, and a portion of the piston unit 500 facing the brake pad 200 is closed.

The piston unit 500 moves together with the nut unit 400 to apply a pressure to the brake pad 200 by being pressed by the nut unit 400 or to release the pressure applied to the brake pad 200 by being released from the nut unit 400. The piston unit 500 moves toward the brake pad 200 by being pressed by the nut unit 400 or moves away from the brake pad 200.

When the piston unit 500 presses the brake pad 200, the brake pad 200 comes into contact with the brake disc 20, thereby generating a braking force. That is, when the piston unit 500 presses the backplate 210 of the brake pad 200, the friction member 220 of the brake pad 200 comes into contact with the brake disc 20.

The bearing unit 600, which is a thrust bearing, supports the rotation of the screw bar 300 and is moved by a repulsive force of the screw bar 300. Specifically, when the piston unit 500 comes into close contact with the brake pad 200 and presses the brake pad 200, the repulsive force is applied to the screw bar 300, and the screw bar 300 is moved in a predetermined direction (e.g., a rearward direction).

Therefore, the bearing unit 600 moves rearward and presses the load switch unit 700. That is, the control unit 800 to be described below may measure a point in time at which the braking force is generated.

The load switch unit 700 is installed in the caliper body 100, disposed to face the bearing unit 600, and operated by being pressed by the bearing unit 600.

The load switch unit 700 includes a housing part 710, a movable block part 720, and a connector part 730. The housing part 710 is installed in the first caliper body 110 of the caliper body 100.

The housing part 710 has a ring shape and an installation hole 711 in which the movable block part 720 to be described below is installed. A passing hole 712 is formed at a central portion of the housing part 710, and the screw bar 300 passes through the passing hole 712.

The movable block part 720 is installed in the housing part 710 and moved by being pressed by the bearing unit 600. When the pressure applied to the bearing unit 600 is released, the movable block part 720 is returned to an original or initial position thereof by an elastic restoring force.

When the bearing unit 600 is moved by the repulsive force of the screw bar 300 and presses the movable block part 720, the movable block part 720 moves rearward and comes into contact with the connector part 730 to be described below. In this case, a point in time at which the repulsive force of the screw bar 300 is generated is a point in time at which the braking force is generated as the piston unit 500 comes into close contact with the brake pad 200 and presses the brake pad 200.

Thereafter, when the braking force is released as the piston unit 500 releases the brake pad 200, the bearing unit 600 releases the movable block part 720, and the bearing unit 600 is returned to the original position thereof by an elastic restoring force of elastic members 722 to be described below. This point in time is a point in time at which the braking force is released.

The movable block part 720 protrudes to the outside of the housing part 710. Therefore, the movable block part 720 may be pressed when the bearing unit 600 is moved by the repulsive force of the screw bar 300.

The movable block part 720 includes a movable block 721 and the elastic members 722. The movable block 721 is movably disposed in the housing part 710 and comes into contact with the connector part 730.

The movable block 721 includes a movable block main body 721*a* and a conductor plate 721*d*. The movable block main body 721*a* is elastically supported by the elastic members 722. The movable block main body 721*a* includes a first movable block main body 721*b* and a second movable block main body 721*c*.

The first movable block main body 721*b* is movably disposed in the installation hole 711 of the housing part 710. The second movable block main body 721*c* is connected to the first movable block main body 721*b*, and the conductor plate 721*d* to be described below is installed at one side of the second movable block main body 721*c*.

The conductor plate 721*d* is installed on the movable block main body 721*a* and comes into contact with contact point parts 732. The conductor plate 721*d* is installed on the second movable block main body 721*c* of the movable block main body 721*a* and brought into contact with the connector part 730 by the movement of the movable block 721.

The elastic member 722, which is a spring, is connected to the movable block 721. The elastic member 722 is coupled to the connector part 730 and elastically supports the movable block 721. Therefore, when the pressing force applied to the movable block 721 by the bearing unit 600 is released, the movable block 721 may be returned to the original position thereof.

The connector part 730 transmits an electrical signal to the control unit 800 by coming into contact with the movable block part 720 when the movable block part 720 moves.

The connector part 730 includes a connector main body 731 and the contact point parts 732. The elastic members 722 are coupled to the connector main body 731. The connector main body 731 includes a first connector main body 731*a*, a coupling plate 731*b*, and a second connector main body 731*c*.

The contact point parts 732 to be described below are installed in the first connector main body 731*a*. The coupling plate 731*b* is connected to the first connector main body 731*a* and coupled to the elastic members 722. The second connector main body 731*c* has a cylindrical shape. The second connector main body 731*c* is connected to the coupling plate 731*b* and surrounds the contact point part 732.

The contact point part 732 is mounted in the connector main body 731 and generates the electrical signal by coming into contact with the movable block 721. The contact point part 732 is provided in plural, and the plurality of contact point parts 732 is mounted in the first connector main body 731*a* of the connector main body 731 and spaced apart from one another.

The contact point part 732 includes a contact point protrusion 732*a* and a terminal 732*b*. The contact point protrusion 732*a* is mounted in the connector main body 731 and comes into contact with the conductor plate 721*d*. The contact point protrusion 732*a* is provided in plural, and the plurality of contact point protrusions 732*a* is mounted in the first connector main body 731*a* of the connector main body 731 and spaced apart from one another.

The terminal 732*b* is connected to the contact point protrusion 732*a*. When the conductor plate 721*d* comes into contact with the contact point protrusions 732*a*, the terminals 732*b* transmit the electrical signal, which is generated between the contact point protrusions 732*a* and the conductor plate 721*d*, to the control unit 800 to be described below. The terminal 732*b* is provided in plural, and the plurality of terminals 732*b* is respectively connected to the contact point protrusions 732*a*. The second connector main body 731*c* of the connector main body 731 surrounds an outer portion of the terminal 732*b*.

The control unit 800 receives the electrical signal from the load switch unit 700 and controls the operation of the motor unit 900 on the basis of the electrical signal. Specifically, on the basis of the electrical signal transmitted from the load switch unit 700, the control unit 800 may predict the point in time at which the braking force is generated.

On the contrary, when the control unit 800 does not receive the electrical signal from the load switch unit 700, the control unit 800 may predict the point in time at which the braking force is released. The control unit 800 may predict the point in time at which the braking force is generated and the point in time at which the braking force is released and calibrate the position of the screw bar 300 by controlling the operation of the motor unit 900.

In this case, the control unit 800 does not always return the position of the screw bar 300 to the initial point in time at which the braking force is generated, but resets the initial point in time of the operation on the basis of the point in time at which the braking force is released, and then returns the position of the screw bar 300 to the reset point in time, thereby reducing initial ineffectiveness, i.e., an ineffective stroke. Moreover, the initial point in time of the operation of the screw bar 300 is reset in accordance with abrasion of the brake pad 200, which makes it possible to reduce the ineffective stroke during the subsequent braking operation.

Hereinafter, an operation and an effect of the brake device for a vehicle according to the embodiment of the present disclosure will be described with reference to FIGS. 2, 3, 9, and 10.

To brake the vehicle, the screw bar 300 is rotated in the predetermined direction by the power from the motor unit 900. When the screw bar 300 rotates in the predetermined direction, the nut unit 400 and the piston unit 500 move toward the brake pad 200, and the piston unit 500 presses the brake pad 200.

The brake pads 200 selectively contact or come into contact with the brake disc 10, such that the braking force is generated. In this case, as the piston unit 500 presses the brake pad 200, a repulsive force is applied to the piston unit 500 and the nut unit 400, and the repulsive force is also applied to the screw bar 300.

The bearing unit 600 is moved rearward by the repulsive force of the screw bar 300, and the bearing unit 600 presses the load switch unit 700, such that the load switch unit 700 operates. That is, the load switch unit 700 is operated or activated by a load of the bearing unit 600.

The load switch unit 700 transmits an electrical signal to the control unit 800. The control unit 800 may predict the point in time at which the braking force is generated, on the basis of the electrical signal transmitted from the load switch unit 700, and display the prediction result on a monitor unit (not illustrated).

Thereafter, when the screw bar 300 is rotated in the direction opposite to the predetermined direction by the power from the motor unit 900 at the time of releasing the braking operation, the nut unit 400 and the piston unit 500 move away from the brake pads 200, and the brake pads 200 are released.

When the brake pads 200 are released, the bearing unit 600 is returned to the original position thereof, the bearing unit 600 stops pressing the load switch unit 700, and the load switch unit 700 stops operating.

The load switch unit 700 does not transmit the electrical signal to the control unit 800, and the control unit 800 may predict the point in time at which the braking force is released and display the prediction result on the monitor unit (not illustrated).

As described above, the control unit 800 uses the load switch unit 700 to predict the point in time at which the braking force is generated and the point in time at which the braking force is released, and calibrates the position of the screw bar 300 by controlling the operation of the motor unit 900 on the basis of the prediction result.

The control unit 800 does not always return the position of the screw bar 300 to the initial point in time at which the braking force is generated by operating the motor unit 900, but resets the initial point in time of the operation on the basis of the point in time at which the braking force is released, and then returns the position of the screw bar 300 to the reset point in time of the operation.

Therefore, it is possible to reduce the initial ineffectiveness, i.e., the ineffective stroke. Moreover, the initial point in time of the operation of the screw bar 300 is reset in accordance with abrasion of the brake pad 200, which makes it possible to reduce the ineffective stroke during the subsequent braking operation.

FIG. 11 is a block configuration view of an apparatus for calibrating a braking force of the brake device for a vehicle to a zero point according to the embodiment of the present disclosure.

Referring to FIG. 11, the apparatus for calibrating the braking force of the brake device for a vehicle to the zero point according to the embodiment of the present disclosure includes the load switch unit 700, the control unit 800, the motor unit 900, a motor current measurement unit 1000, and an output unit 1100.

In this case, because the load switch unit 700 and the motor unit 900 are identical to those of the above-mentioned embodiment, detailed descriptions thereof will be omitted.

The motor current measurement unit 1000 measures motor current, which is applied as the motor 910 operates, and inputs the measured motor current to the control unit 800.

The output unit 1100 outputs a result of monitoring the motor current. For example, when the control unit 800 determines that a motor current monitoring function fails, the output unit 1100 notifies an occupant or the like of the failure of the motor current monitoring function through an image or sound on the basis of a control signal of the control unit 800. In this case, the occupant or the like may recognize the failure of the function.

The output unit 1100 may be, but not particularly limited to, a cluster (not illustrated) of a vehicle.

The control unit 800 rotates the screw bar 300 by operating the motor 910. The nut unit 400 rectilinearly moves as the screw bar 300 is rotated by the power from the motor unit 900. Depending on the rotation direction of the screw bar 300, the nut unit 400 moves toward the brake pad 200 to press the brake pad 200 or moves away from the brake pad 200 to release the brake pad 200.

The control unit 800 may receive an electrical signal from the load switch unit 700 and control the operation of the motor unit 900 on the basis of the electrical signal.

In this case, the control unit 800 receives the motor current measured by the motor current measurement unit 1000 and estimates a load of the bearing unit 600 on the basis of the motor current.

The control unit 800 may detect an estimated load which is expected to be applied to the screw bar 300 for each motor current, by storing a load for each motor current through a form of a lookup table or calculating a load on the basis of the motor current.

The method of estimating the load of the bearing unit 600 on the basis of the motor current is not particularly limited.

Meanwhile, the control unit 800 receives the electrical signal from the load switch unit 700 as described above by the operation of the motor unit 900.

That is, to brake the vehicle, the screw bar 300 is rotated in the predetermined direction by the power from the motor unit 900, the nut unit 400 and the piston unit 500 move toward the brake pad 200, and the piston unit 500 presses the brake pad 200.

The braking force is generated as the brake pads 200 come into contact with the brake disc 10. As the piston unit 500 presses the brake pad 200, the repulsive force is applied to the piston unit 500 and the nut unit 400, and the repulsive force is also applied to the screw bar 300.

The bearing unit 600 is moved rearward by the repulsive force of the screw bar 300, and the bearing unit 600 presses the load switch unit 700, such that the load switch unit 700 operates or is activated and inputs the electrical signal to the control unit 800. As described above, the electrical signal is inputted to the control unit 800 when a load is actually generated by the operation of the motor unit 900.

Therefore, on the basis of the electrical signal inputted or received from the load switch unit 700 by the actual generation of the load, the control unit 800 may calibrate the zero point of the estimated load estimated on the basis of the motor current and calibrate an origin point of the braking force. That is, the control unit 800 performs zero point calibration on an initial braking force when the braking force is generated by actually controlling the motor 910.

The point in time at which the electrical signal inputted from the load switch unit 700 is inputted is a point in time at which a load is actually generated. The control unit 800 calibrates the estimated load, which is estimated on the basis of the motor current, to 0 at the point in time at which the electrical signal is inputted from the load switch unit 700, thereby performing the zero point calibration on the electric current estimated on the basis of the motor current. Therefore, the control unit 800 performs the zero point calibration on the initial braking force when the braking force is generated by actually controlling the motor 910.

For example, when the motor operates as the control unit 800 applies the electric current to the motor, the motor current measurement unit 1000 measures the motor current.

In this case, the control unit 800 estimates the load on the basis of the measured motor current, and the estimated load may be larger than 0.

However, when the electrical signal is inputted from the load switch unit 700 in this process, it can be seen that the load estimated on the basis of the motor current is incorrect because the point in time at which the electrical signal is inputted is the point in time at which the load is actually generated.

Therefore, the control unit 800 calibrates the estimated load estimated on the basis of the motor current to 0 when the estimated load is larger than 0 at the point in time at which the electrical signal is inputted from the load switch unit.

Moreover, the control unit 800 may calibrate all the estimated loads for the respective motor currents by calibrating the lookup table or calculation formulas for estimating the load on the basis of the motor current.

A magnitude of the estimated load at the point in time at which the electrical signal is inputted may be an error. For example, the control unit 800 may calibrate all the estimated loads for the respective motor currents by subtracting the estimated load (error), which is estimated at the point in time at which the electrical signal is inputted, from the respective estimated loads in the lookup table.

Meanwhile, the control unit 800 determines that the motor current monitoring function of the motor current measurement unit 1000 fails when the estimated load estimated on the basis of the current motor current is maintained to be 0 for a predetermined time or longer in a state in which the electrical signal inputted from the load switch unit 700 exceeds 0.

Typically, the motor is operated by the motor current, and the piston is moved, before a circuit of the load switch unit 700 is closed.

Therefore, the control unit 800 determines that the motor current monitoring function fails when the estimated load estimated on the basis of the motor current is continuously 0 in the state in which the electrical signal is inputted from the load switch unit 700 (the electrical signal is larger than 0). Further, the control unit 800 outputs the failure of the motor current monitoring function through the output unit 1100.

In this case, the output unit 110 may warn of the failure of the motor current monitoring function through an image or sound.

Hereinafter, a method of calibrating a braking force of the brake device for a vehicle to a zero point according to the embodiment of the present disclosure will be described in detail with reference to FIG. 12.

Figure 12:
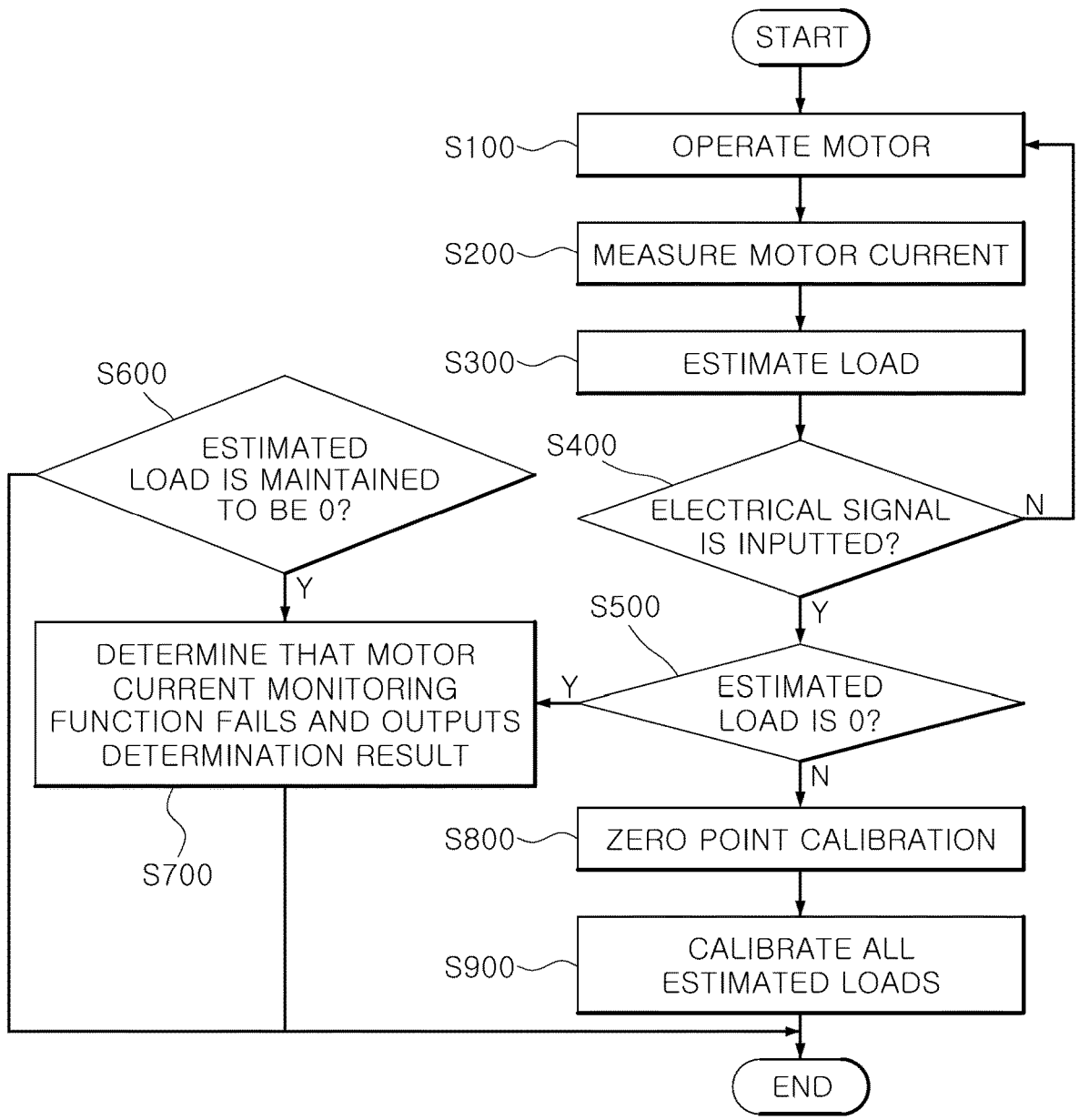
FIG. 12 is a flowchart of a method of calibrating a braking force of the brake device for a vehicle to a zero point according to the embodiment of the present disclosure.

FIG. 12 is a flowchart of a method of calibrating a braking force of the brake device for a vehicle to a zero point according to the embodiment of the present disclosure.

Referring to FIG. 12, the control unit 800 operates the motor 910 (S100).

As the motor unit 900 operates, the motor current measurement unit 1000 measures the motor current of the motor 910 and inputs the measurement result to the control unit 800.

The control unit 800 estimates the load on the basis of the motor current inputted from the motor current measurement unit 1000 (S300).

In addition, when the motor unit 900 operates, the screw bar 300 is rotated by the power from the motor unit 900, such that the nut unit 400 rectilinearly moves.

That is, to brake the vehicle, the screw bar 300 is rotated in the predetermined direction by the power from the motor unit 900, the nut unit 400 and the piston unit 500 move toward the brake pad 200, and the piston unit 500 presses the brake pad 200.

The braking force is generated as the brake pads 200 come into contact with the brake disc 10. As the piston unit 500 presses the brake pad 200, the repulsive force is applied to the piston unit 500 and the nut unit 400, and the repulsive force is also applied to the screw bar 300.

The bearing unit 600 is moved rearward by the repulsive force of the screw bar 300, and the bearing unit 600 presses the load switch unit 700, such that the load switch unit 700 operates and inputs the electrical signal to the control unit 800.

Therefore, the control unit 800 checks whether the electrical signal is inputted from the load switch unit 700 (S400). When the electrical signal is inputted, the control unit 800 checks whether the estimated load, which is estimated as described above, is 0 (S500).

When the check result in step S500 indicates that the estimated load is 0, the control unit 800 determines whether the estimated load is maintained to be 0 for a predetermined time or longer (S600).

When the determination result in step S600 indicates that the estimated load is maintained to be 0, the control unit 800 determines that the motor current monitoring function fails and outputs the determination result through the output unit 110 (S700).

When the determination result in step S610 indicates that the estimated load is not maintained to be 0 and the estimated load varies, the control unit 800 determines that the estimated load is normal.

In contrast, when the check result in step S500 indicates that the estimated load is not 0, the control unit 800 calibrates the estimated load, which is estimated on the basis of the motor current, to 0 at the point in time at which the electrical signal is inputted from the load switch unit 700 (S800).

Further, the control unit 800 may calibrate all the estimated loads for the respective motor currents by calibrating the lookup table or calculation formulas for estimating the load on the basis of the motor current (S900).

As described above, the apparatus and method for calibrating the braking force of the brake device for a vehicle to the zero point according to the embodiment of the present disclosure calibrate the point in time at which the generation of the load by the motor current is estimated by using the point in time at which the load is actually generated on the brake pads of the brake device for a vehicle, thereby reducing the initial ineffectiveness and improving precision in calculating the output load.

For example, the configurations described in the present specification may be implemented as methods or processes, devices, software programs, data stream, or signals. Even though the implementation of the single form is described (e.g., only the method is described), the described features may also be in other forms (e.g., devices or programs). The device may be implemented as appropriate hardware, software, firmware, and the like. For example, the method may be implemented by devices such as processors generally referring to processing devices including computers, microprocessors, integrated circuits, programmable logic devices, or the like. The processors also include communication devices such as computers, cellular phones, portable/personal information terminals (personal digital assistants (PDA)), and other devices that easily perform information communication with final users.

While the present disclosure has been described with reference to the embodiment illustrated in the drawings, the embodiment is described just for illustration, and those skilled in the art to the present technology pertains will understand that various modifications of the embodiment and any other embodiment equivalent thereto are available.

Accordingly, the true technical protection scope of the present disclosure should be determined by the appended claims.

What is claimed is:

1. A brake system for a vehicle, comprising:
    a caliper body surrounding a brake disc;
    a pair of brake pads disposed at the caliper body, facing each other and positioned respectively at two opposite sides of the brake disc;
    a screw bar disposed at the caliper body and configured to rotate when supplied with power from a motor unit;
    a nut unit configured to rectilinearly move by a rotation of the screw bar;
    a piston unit surrounding an outer portion of the nut unit and configured to move with the nut unit to press one of the pair of brake pads;
    a bearing unit configured to support the rotation of the screw bar and move by a repulsive force of the screw bar; and
    a load switch unit disposed at the caliper body, facing the bearing unit, and configured to be activated when pressed by the bearing unit.

2. The brake system of claim 1, further comprising a control unit configured to receive an electrical signal from the load switch unit and control the motor unit based on the received electrical signal.

3. The brake system of claim 2, wherein the load switch unit comprises:
    a housing part disposed at the caliper body;
    a movable block part disposed at the housing part and configured to move away from an initial position when pressed by the bearing unit and return to the initial position by an elastic restoring force when a pressure from the bearing unit is released; and
    a connector part configured to selectively contact the movable block part and transmit the electrical signal to the control unit when the movable block part moves away from the initial position.

4. The brake system of claim 3, wherein the movable block part protrudes externally from the housing part.

5. The brake system of claim 4, wherein the movable block part comprises:
    a movable block movably disposed at the housing part and configured to selectively contact the connector part; and
    an elastic member connected to the movable block, coupled to the connector part, and configured to elastically support the movable block.

6. The brake system of claim 5, wherein the connector part comprises:
    a connector main body coupled to the elastic member; and
    a contact point part disposed at the connector main body and configured to generate the electrical signal when contacting the movable block.

7. The brake system of claim 6, wherein the movable block comprises:
    a movable block main body elastically supported by the elastic member; and
    a conductor plate disposed at the movable block main body and configured to selectively contact the contact point part.

8. The brake system of claim 7, wherein the contact point part comprises:
    a contact point protrusion disposed at the connector main body and configured to selectively contact the conductor plate; and
    a terminal connected to the contact point protrusion and configured to transmit the electrical signal to the control unit, the electrical signal being generated between the contact point protrusion and the conductor plate when the conductor plate contacts the contact point protrusion.

9. An apparatus for performing a zero-point calibration on a braking force of a brake device for a vehicle, the apparatus comprising:
    a load switch unit configured to output an electrical signal when a brake pad presses a brake disc and a screw bar is moved by a repulsive force;
    a motor current measurement unit configured to measure a motor current of a motor that rotates the screw bar so that the brake pad presses the brake disc; and
    a control unit configured to estimate, for the measured motor current, a load applied to the screw bar when the motor is activated, and calibrate the estimated load to zero based on the electrical signal.

10. The apparatus of claim 9, wherein the control unit is configured to calibrate the estimated load to zero based on the load estimated when the electrical signal is received from the load switch unit.

11. The apparatus of claim 10, wherein, when the estimated load is not zero, the control unit is configured to calibrate the estimated load to zero.

12. The apparatus of claim 9, wherein the control unit is configured to calibrate the estimated load for each measured motor current based on the calibrated zero load.

13. The apparatus of claim 9, wherein the control unit is configured to determine that the motor current measurement unit has failed to perform a motor current monitoring function when the estimated load is maintained at zero for a predetermined time after the electrical signal is received from the load switch unit.

14. A method of performing a zero-point calibration on a braking force of a brake device for a vehicle, comprising:
    measuring a motor current of a motor when the motor rotates a screw bar so that a brake pad presses a brake disc;
    estimating a load applied to the screw bar for each measured motor current;
    outputting an electrical signal when the brake pad presses the brake disc and the screw bar is moved by a repulsive force; and
    performing the zero-point calibration on the load estimated when outputting the electrical signal.

15. The method of claim 14, wherein performing the zero-point calibration comprises performing the zero-point calibration based on the load which is estimated when the electrical signal is outputted.

16. The method of claim 15, wherein performing the zero-point calibration comprises calibrating the load, which is estimated when the electrical signal is outputted, to zero.

17. The method of claim 14, wherein performing the zero-point calibration comprises calibrating the estimated load for each measured motor current based on the zero-point calibration performed when outputting the electrical signal.

18. The method of claim 14, further comprising determining that a motor current monitoring function has failed when the estimated load is maintained at zero for a predetermined time after the electrical signal is outputted.

* * * * *